United States Patent [19]

Chesavage et al.

[11] Patent Number: 5,479,189
[45] Date of Patent: Dec. 26, 1995

[54] 4 CHANNEL COLOR DISPLAY ADAPTER AND METHOD FOR COLOR CORRECTION

[76] Inventors: Jay Chesavage, 3833 Middlefield Rd., Palo Alto, Calif. 94303; Miles Kurland, 960A Crest Dr., Santa Rosa, Calif. 95405; Keith Lueck, 72 Sparrow Pt. Cir., Fenton, Mo. 63026

[21] Appl. No.: 348,765

[22] Filed: Dec. 2, 1994

Related U.S. Application Data

[63] Continuation of Ser. No. 55,955, May 3, 1993, abandoned, which is a continuation-in-part of Ser. No. 662,218, Feb. 28, 1991, abandoned.

[51] Int. Cl.$^6$ .................................................. G09G 1/28
[52] U.S. Cl. ........................ 345/154; 345/199; 345/150; 358/523
[58] Field of Search .................................. 345/150, 153, 345/154, 155, 186, 199; 358/518, 523; 348/577

[56] References Cited

U.S. PATENT DOCUMENTS

| | | | |
|---|---|---|---|
| 4,598,282 | 7/1986 | Pugsley | 340/701 |
| 4,686,520 | 8/1987 | Yamaoka | 340/701 |
| 4,814,867 | 3/1989 | Tsuda et al. | 358/80 |
| 4,992,862 | 2/1991 | Gabor | 358/80 |
| 5,059,955 | 10/1991 | Yamamura | 340/701 |

*Primary Examiner*—Richard Hjerpe
*Assistant Examiner*—Doon Chow
*Attorney, Agent, or Firm*—Flehr, Hohbach, Test, Albritton & Herbert

[57] ABSTRACT

A four channel color display processor is described using separated cyan, magenta, yellow, and black color descriptions for color components. Each color component is then modified to enable use with a color monitor utilizing red, green, and blue phosphors. Colors are corrected prior to presentation to the color monitor, to eliminate the non-idealities of the color monitor, printing inks, or both. This invention allows the representation of colors shown in the color display to more accurately reflect the actual printed output.

2 Claims, 5 Drawing Sheets

4 CHANNEL COLOR DISPLAY ADAPTER AND METHOD FOR COLOR CORRECTION

This is a continuation of application Ser. No. 08/055,955, filed May 3, 1993, now abandoned which is a continuation-in-part of application Ser. No. 07/662,218, now abandoned, filed Feb. 28, 1991.

FIELD OF THE INVENTION

This invention relates to a device for displaying color images on a video display terminal. Specifically, the invention allows the accurate video presentation of colors used in a four color printing process, where the printing process colors are cyan, magenta, yellow, and black, but the viewed video display colors are typically red, green, and blue. Additionally, this invention allows the calibration of the color video display to compensate for a variety of color distortions, or four color printing process inking non-linearities. Lastly, a method is disclosed for implementing these color corrections to the video display.

DESCRIPTION OF THE PRIOR ART

There is a great volume of prior art relating to color display systems. Systems well known to one skilled in the art include frame buffer display systems, comprising a 2 dimensional array of pixels, each pixel comprising 8 bits of each of three colors, commonly red, blue, and green. These systems have the advantage of presenting the full gamut of colors available, as each of 3 channels of 8 bit data allows 16,777,216 unique colors to be presented. In general, the memory requirements for a frame buffer are $n*w*v*h$ bits, where n is the number of color channels, w is the number of bits used to represent each color channel, v is the number of vertical lines displayed, and h is the number of horizontal pixels displayed. Because of the large memory requirements of such systems, color systems based on palettes of 256 colors have been used. These systems allow a wide range of colors to be specified in a look-up table, which is separately initialized with the color information. The chief advantage of these systems is that they require only ⅓ as much memory as the frame buffers, as they store 8 bits per pixel rather than the 24 bits per pixel required by frame buffers. The disadvantage of these palette based systems is that they only allow the simultaneous presentation of 256 different colors.

U.S. Pat. No. 4,814,867 (Tsuda et al) discloses a color correction processor for printing using memory whose output data is described by an input address. This memory is initialized with the correction curve desired, and the output data is compensated with respect to the input data.

U.S. Pat. No. 4,500,919 (Schreiber) describes a color correction processor based on a luminance, hue, and chrominance model. This processor enables the correction of color based on converting an RGB image to LHC (luminance, hue, and chrominance). Manipulations are then performed in this domain, and final images are converted back to RGB (or CMYK).

U.S. Pat. No. 4,853,768 (Suzuki et al) describes a look-up table utilizing coefficients derived from linear combinations of adjacent CMY channels, but does not utilize a K channel. Corrections for various non-linearities and non-orthogonalities are performed sequentially in specific color correction processors.

U.S. Pat. No. 4,901,258 (Akiyama) describes a method and apparatus for quickly generating look-up table data from sparse correction data points. Such a technique would be of interest for rapidly re-mapping color data in a frame buffer using hardware optimized for this purpose.

OBJECT AND SUMMARY OF THE INVENTION

The four color printing process is commonly used for the production of high quality print media. This media is printed in a four step process: each of the colors cyan, magenta, yellow, and black (known as process colors) is successively applied to the paper, and the resultant printed image enables the graphic artist to display the largest gamut of colors. Colored inks are applied to the paper with a set of etched metal plates. The etching on these plates is done such that the active (printing) area comprises a planar array of cells of variable size and generally fixed depth. These cells will later be filled with ink for transfer to the media. The cells are typically arranged in fixed and repeating patterns. The resolution of the resultant images is determined by the density, or average center to center spacing of these cells. The color density for each plate is modulated by changing the relative size of each cell to occupy from 0% to somewhat less than 100% of its maximum area. The arrangement of these cells is frequently on a rectangular grid, and each grid pattern from one plate to the next is rotated a fixed angle with respect to the other grids. This rotation has the effect of forcing interference between the 4 superimposed inking cells at regular intervals, but guarantees fine structure to this interference, and advantageously lowers the registration requirements between successive printing plates. When the individual cells from each of the four plates are coated with the inking color associated with that plate, the ink fills these cells, and the surplus ink is removed with a flexible blade. When paper feeds past these inked plates under pressure, the ink transfers to the printing paper. The paper then passes through each of the remaining 3 colored inking plates. Because the volume of each inked cell is very small, the ink transfer is essentially independent of the speed of the printing press, allowing high speed printing.

Frequently, the graphic artwork for this production process is prepared on a computer to create and edit images. These images are displayed on a color monitor, and are eventually output to a color separation system. Because the color display systems are three channel color additive (red, green, blue) and the desired output is four color negative (cyan, magenta, yellow, black), a transformation is applied to synthesize the three color positive system to a four color subtractive system. Once these separations are performed, physical printing plates may be prepared from the separation data. These color separators take data in RGB (red, green, blue) format, or more commonly, CMYK (cyan, magenta, yellow, black) format and produce 4 plates suitable for use on the four color printing press.

There are three primary difficulties with the prior art approaches used for this purpose. The first problem is that the transformation from RGB to CMYK results in unfaithful reproduction of the desired colors. There are several reasons for the lack of accurate color reproduction in the printed media. Among these is additivity failure of inks caused by color masking. This masking occurs when inks of various colors are applied on top of each other, and the transparency of each ink affects the observed color. The observed color is also found to depend on the order of application of the inks. The second problem is that the actual color displayed on the monitor may not be the same as the desired color. This occurs because there is no commonly observed manufacturing standard governing the production of any particular color gamut on a color monitor. In fact, most color monitors have user adjustments to enable changing colors to satisfy the user's individual desires. Aging of the phosphors in the monitor also contributes to temporal instability of the colors available. Prior art systems have sought to relieve this problem with orthogonal correction look-up tables, one for each color channel. These systems would completely eliminate the error if the individual color channels were fully orthogonal and not interdependent, but this is not the case. An example of non-orthogonality is ink color masking. If the printed dot is of sufficiently small pitch, the system is generally additive. If, for example, the last applied ink is cyan, and the density of cyan increases, then the dot size of cyan will grow until it begins to mask the surrounding colors. Such prior art look-up tables would fail to subdue the masked colors in the presented image. A third problem is that the absence of a dedicated black channel available for color editing means that the user generally can't control the specific relationships between the black channel and the other color channels because the black channel is not explicitly displayed.

The improved display system consists of an interface to allow the interchange of data, memory means for storage of this data, multiplier means to form the product of each of the color channels with the K channel, and a video output to display the resulting images on a color monitor. Also disclosed is a look-up table for calibrating the color display to either an external standard such as a set of standard colors, or to enable the inclusion of color correction from the actual printing process.

DESCRIPTION OF THE PREFERRED EMBODIMENT

Figure 1:
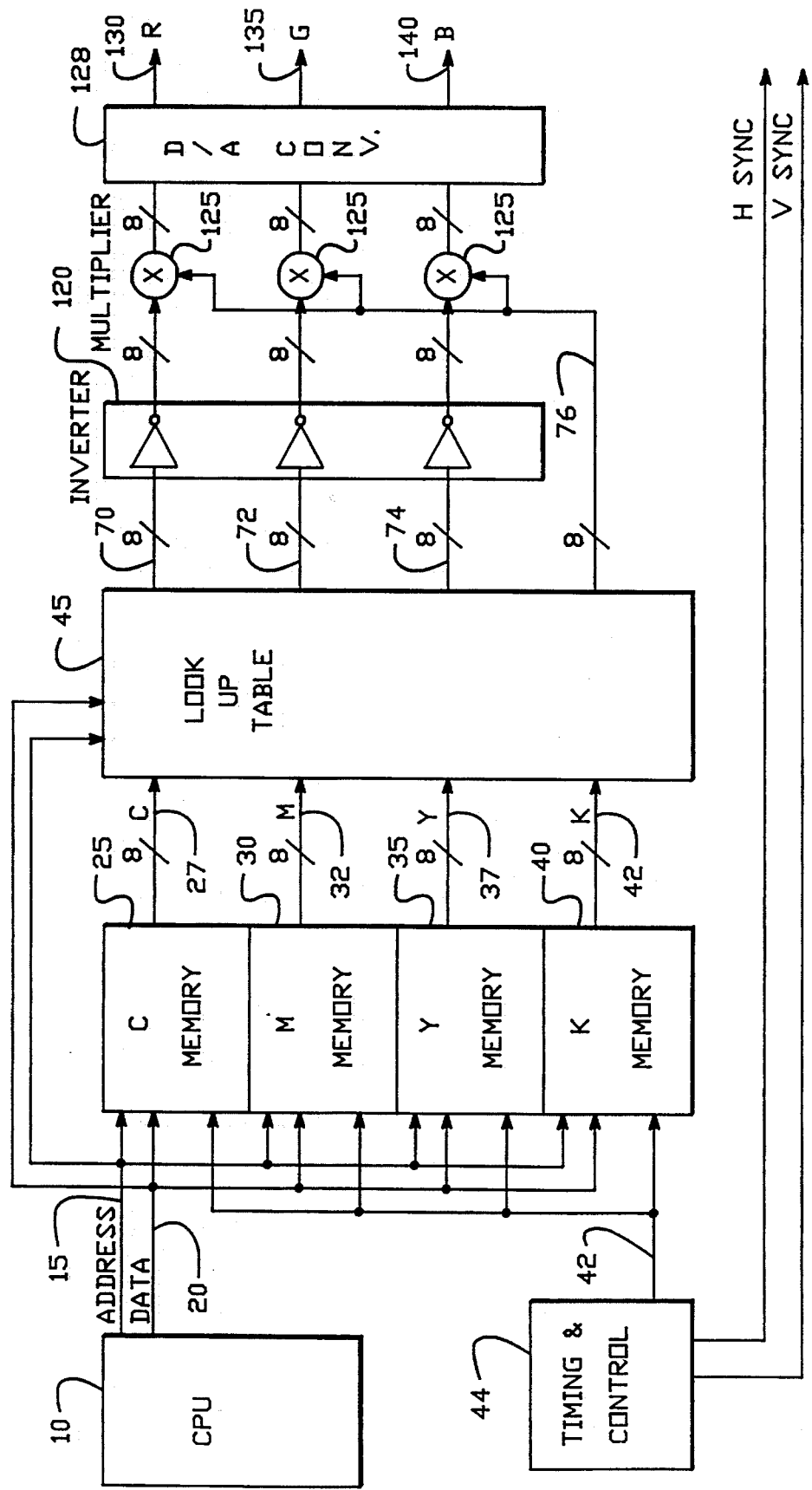
FIG. 1 discloses a color display processor wherein three primary color variables and one primary intensity variable are converted to three secondary color variables.
Figure 2:
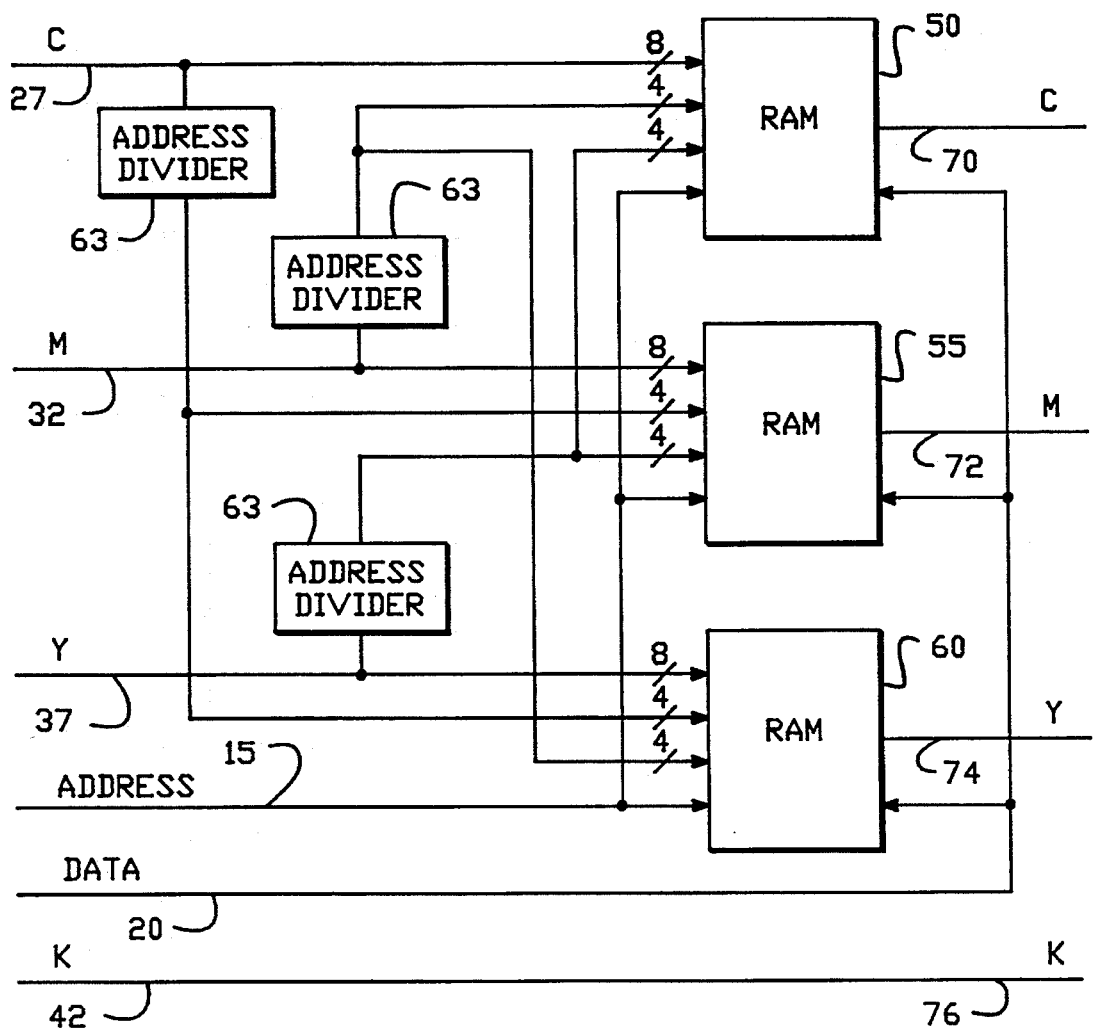
FIG. 2 discloses a look up table color correction circuit wherein color variables are corrected using colors from the primary channel, as well as colors from the adjacent channels.
Figure 3:
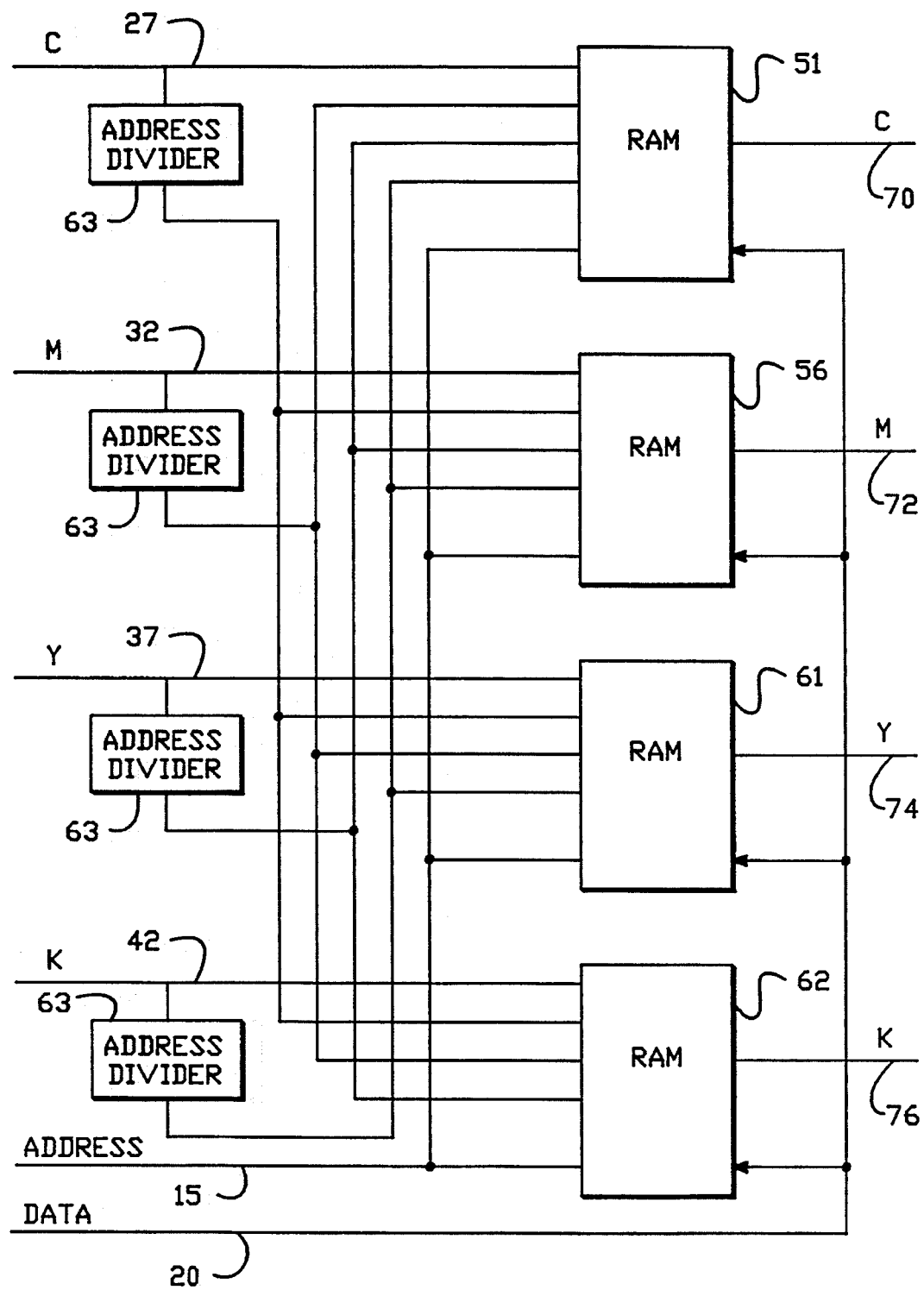
FIG. 3 discloses a look up table color correction circuit wherein color variables are corrected using colors from all channels, including black.

FIG. 1 discloses a four color display processor. 15 and 20 are the interface means, comprising the address buss and data buss, respectively, from an external or internal central processing unit (CPU) 10. This CPU including interface means would be commonly found as part of the system controlling the four color display processor. The width of the data buss is arbitrary, but it is clear to one skilled in the art that a 32 bit word size would allow the simultaneous transfer of primary color variables cyan, magenta, yellow, and black, where each appears with 8 bit resolution. However, any buss width which adequately transfers this data is sufficient. 25, 30, 35, and 40 are the cyan, magenta, yellow, and black memory means, respectively. Said memory means is used to store said primary color channel variables, as well as the primary intensity variable, black. Said memory means 25, 30, 35, and 40 receive common address inputs from either 15, the CPU address, or from 42, the address provided by 44, the timing and control circuitry. During a CPU read or write cycle, the memory means address is furnished from 15, and the address describes the location of an individual pixel, each pixel comprising the desired primary color channel variables cyan, magenta, yellow, and the primary intensity variable, black, where the data word 20 contains the values of each of these variables, preferably in the format of a 32 bit word, each of the four variables comprising an 8 bit contribution. When a CPU read or write cycle is not taking place, the primary color channel variables and primary intensity variable are continuously read out of 25,30,35, and 40 and furnished to 45, the look-up table, the address for this operation being furnished by 44, the timing and control circuitry. The purpose of 44 is to ensure that the primary color channel variables produced by 25, 30, 35, and 40 are synchronized to the locus of points described by the movement of each of the three CRT electron beams over the colored phosphors in the color display monitor. This synchronization provides a stable image for the viewer to observe. Other functions may be performed by 44, such as video field zoom and pan, or video field interlacing, and the like, available through modified addressing of the memory means, using techniques well known to one skilled in the art. The look-up table 45 converts the three primary color channel variables 27, 32, and 37 and primary intensity variable 42 into four secondary color channel variables 70, 72, 74, and a secondary intensity variable 76. 45 is described in greater detail in FIG. 2. 50, 55, and 60 are the look-up tables responsible for color corrections for cyan, magenta, and yellow respectively. The input address for any individual color is comprised of all of the input bits of one of the primary color variables, along with the most significant four bits of each of the other two primary color variables, formed using address dividers 63. For example, the address to cyan table memory 50 comprises the entire eight bits of cyan data 27, the most significant four bits of magenta data 32, and the most significant four bits of yellow data 37. This twelve bit input data would uniquely define the secondary channel variable cyan 70. The contents of this memory could be initialized with the desired value of cyan, corrected for the influence of specific levels of magenta and yellow, through the data port 20. Address port 15 is used to define the specific location to initialize with the data 70, 72, and 74. In general, when initializing the table memories 50, 55, and 60, the address 15 provided by the CPU 10 is identical to the address defined by the combinations of bits from 27, 32, 37, and 42, and the data 20 provided to this address is identical to that expected at the secondary color channel variables 70, 72, and 74. Using these techniques and others known to one skilled in the art, said table memory means may be initialized with the data required to correct deficiencies in either the CRT display or the inking process. For this particular embodiment, FIG. 2 shows an implementation where 76, the secondary intensity variable, and 42, the primary intensity variable, are identical, although it will become clear that this is not necessarily desirable. As an alternative embodiment, FIG. 3 discloses a look-up table memory based on color correcting the primary color channel variables cyan 27, magenta 32, or yellow 37 and primary intensity variable 42 using all of the input bits of the primary variable, and the most significant bits of each of the other three channel variables. For example, cyan table memory 51 could be addressed with the eight bits of cyan 27, four bits of each of magenta 32, yellow 37, and black 42. Similarly, black table memory 62 could be addressed with eight bits of black 42, and four bits of each of cyan 27, magenta 32, and yellow 37. While the embodiment of FIG. 3 results in more accurate color mapping, the size of the correction memory can become undesirably large. It is possible to control the size of this table memory by carefully choosing the function of the address divider 63. This address divider may comprise a look-up table, or a truncation of the address to its most significant bits. For the purposes of example only, the table memory address has been disclosed with specific combinations of other channel data bits. It must also be pointed out that while the value of truncation has been uniformly distributed across other channels, it is not necessary to restrict the addressing in this manner. For example, it could be quite sensible to address table memory means 51 with eight bits of primary, 4 bits of the remaining color channel variables, 2 bits of primary intensity variable, while table memory means 62 could be addressed by 8 bits of 42, 2 bits of yellow, 3 bits of cyan, and 4 bits of magenta. It is clear to one skilled in the art that many other distributions of data are conceivable for a single channel.

Figure 4:
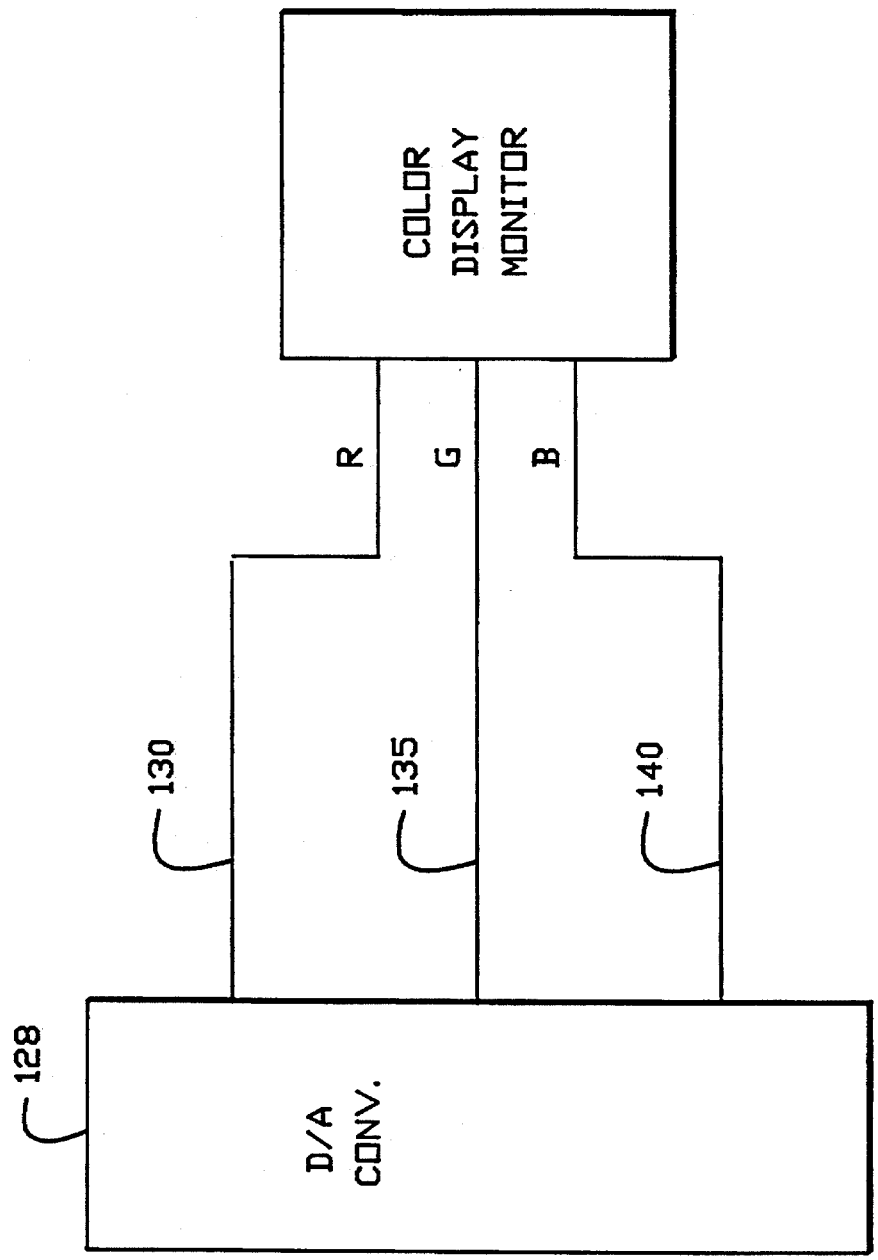
FIG. 4 is a block diagram showing how a color display monitor is connected to FIG. 1.

Referring now to FIG. 1, the output of the look-up table are the secondary color channel variables cyan 70, magenta 72, yellow 74, and the secondary intensity variable, black 76. Each of 70, 72, and 74 is converted from CMY to RGB using inverting means 120. The purpose of inverting means 120 is to convert each of the subtractive process colors cyan, magenta, and yellow, into their additive light analogues red, blue, and green. Multiplier means 125 forms the product of each of the secondary color variables with the secondary intensity variable 76 to produce each of the video display color variables 130 red, 135 green, and 140 blue. Digital to analog converter means 128 enables the conversion of the processed digital signals to analog signals for presentation to the display monitor as shown in FIG. 4. It is clear to one skilled in the art that several means of forming products of the K channel and the processed secondary channel variables is available, among them the use of a multiplying digital to analog converter 128 wherein the intensity channel variable is converted to an analog voltage and used to drive the reference voltage for 128.

Figure 5:
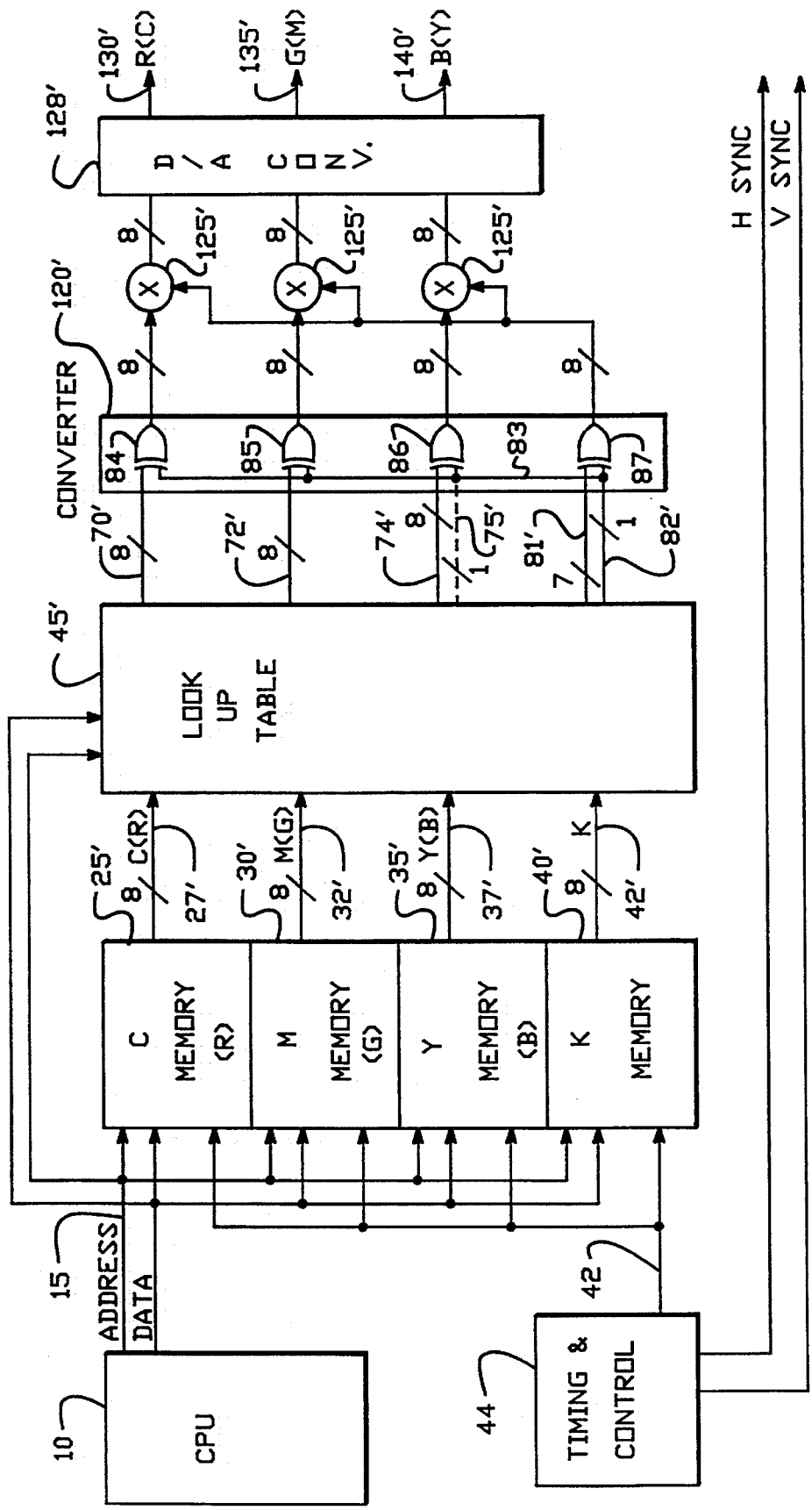
FIG. 5 is a block diagram of a portion of the display processor of FIG. 1 and showing an alternative embodiment.

FIG. 5 is an alternative embodiment of FIG. 1 where similar components have similar numbers and where the component is used somewhat differently it is primed. And more specific, in the memory 25', 30', 35' 40' in addition to storing primary color channel variables such as cyan, magenta, yellow and black, an alternate or another color set, shown in parenthesis, of red, green and blue may also selectively be stored. Thus the output of the primary channel variables 27', 32', and 37' as well as 42' for the look-up table 45 may also include as shown in parenthesis, red, green and blue. Depending on the type of computer systems such as the MacIntosh versus the IBM, it may be useful to initially operate with one or the other type of color set.

Moreover, it is frequently desirable to switch back and forth to display either red, green and blue or cyan, magenta and yellow as shown by the color display output 130', 135' and 140'. As a method of allowing such simultaneous display but still operating in the constraint of a 32 bit memory system, it is advantageous to use one of the bits of either the primary or secondary color channel variables (i.e., 27', 32', 37' or 70', 72', or 74'), or the primary or secondary intensity variable 42' or 81'. And specifically as shown in the drawing of FIG. 5, one of the bits (the least significant) of the secondary intensity variable 81' designated 82 is utilized in the present embodiment. Such bit has encoded the single attribute RGB or CMY. More specifically the bit 82 drives via the line 83 one of the inputs of the three Exclusive or gates 84, 85 and 86 and the normal or gate 87. Thus the secondary channel variable outputs 70' 72', and 74', are either inverted or non-inverted and coupled to their respective multipliers 125 and multiplied by the K channel. Alternatively one bit of information can be obtained as shown by the dashed line 75', for example, by use of the least significant bit of the channel 74' (or the other secondary channel variables). And such least significant bit could be obtained on the primary side 27', 32', 37' or 42'. The subtraction of, for example, one bit from the black or K channel would reduce resolution from 0.4% to 0.8% which is acceptable for visual matching. Thus by the use of the single bit attribute on line 82' (or alternatively 75') the converter 120 has the capability to change incoming secondary color channel variables from CMY to RGB or vice versa or not inverting to maintain an RGB color display output (i.e., 130', 135, 140'). Thus in summary the main purpose of the converting means 120' is to convert each of the subtractive colors cyan, magenta and yellow into additive light analogs red, green and blue, when the attribute 82' is on, and to pass the RGB values which may be, of course, selectively stored in the memory 25', 30', 35', 40' when the attribute is off.

What is claimed is:

1. A real time color display processor comprising:
   (a) memory means for storing three primary color channel variables and a primary intensity variable;
   (b) interface means for storing or retrieving said primary color channel variables and said primary intensity variable to and from said memory means;
   (c) look-up table (L.U.T.) means for converting said three primary color channel variables and said primary intensity variable to three corresponding secondary color channel variables and a secondary intensity variable, said L.U.T. means being individually responsive to each one of said primary color channel variables and to substantially only the most significant bits of the other two of said three primary color channel variables to provide said three corresponding secondary channel variables; said three primary color channel variables comprising either a first color set of red, green, blue or a second color set of cyan, magenta, yellow and said secondary channel variables corresponding to said first or second color sets;
   (d) multiplier and converter means for selectively creating display color channel variables including converter means for selectively inverting all of such secondary channel color variables and multiplier means for multiplying said secondary channel color variables with said secondary intensity variables;
   (e) switching means for controlling said selective inverting responsive to and actuated by information contained in any one of said primary or secondary intensity variables and said primary or secondary color channel variables;
   (f) output means for viewing said display color channel variables on a display monitor.

2. A color display processor as in claim 1 where said information is the least significant bit of said second intensity variable.

* * * * *